April 14, 1959 M. W. ZELLERS 2,882,381
ELECTRIC HEATER
Filed March 19, 1957 2 Sheets-Sheet 1
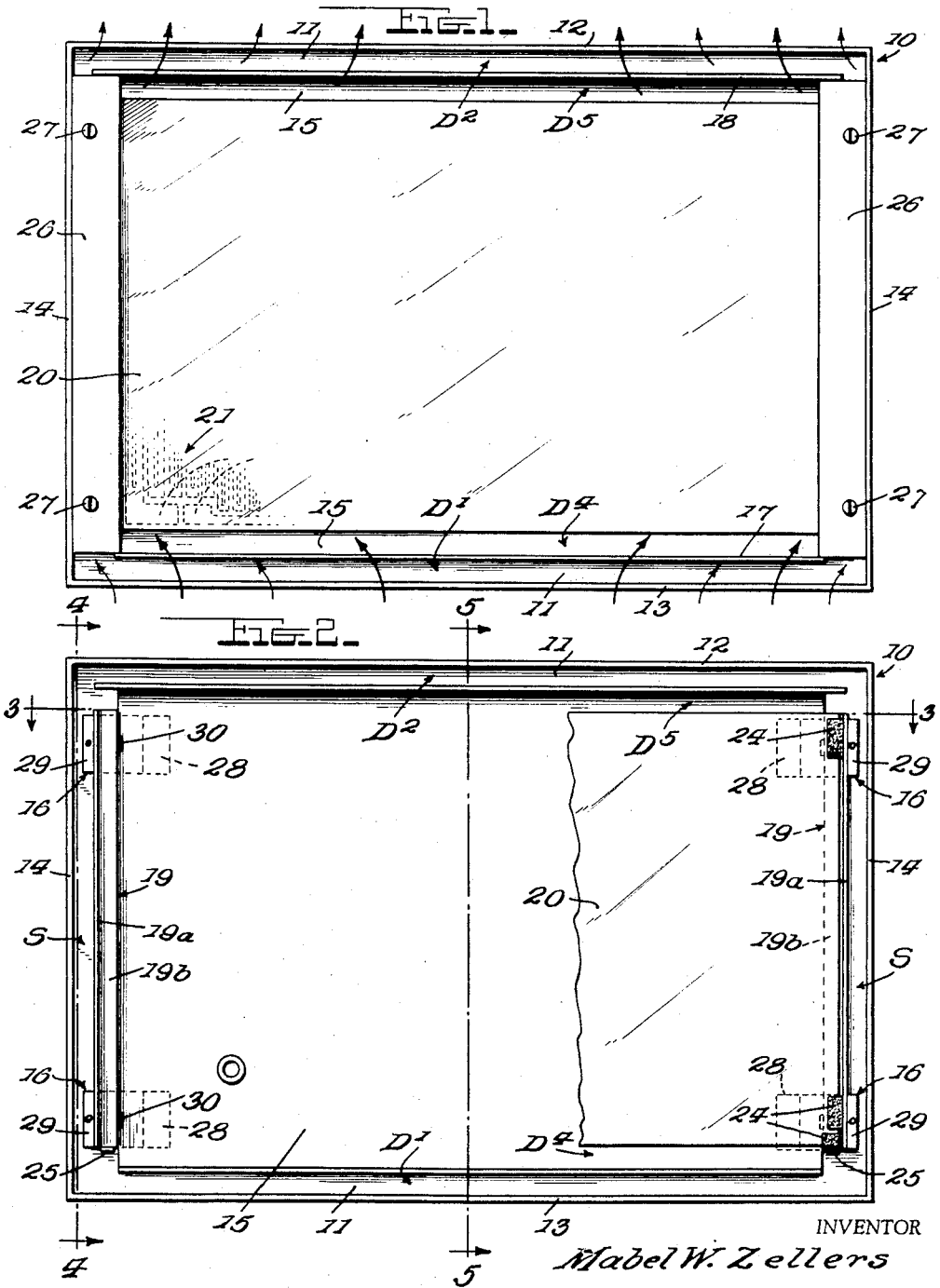
INVENTOR
Mabel W. Zellers
BY Lowry & Rinehart
ATTORNEYS April 14, 1959 M. W. ZELLERS 2,882,381
ELECTRIC HEATER
Filed March 19, 1957 2 Sheets-Sheet 2
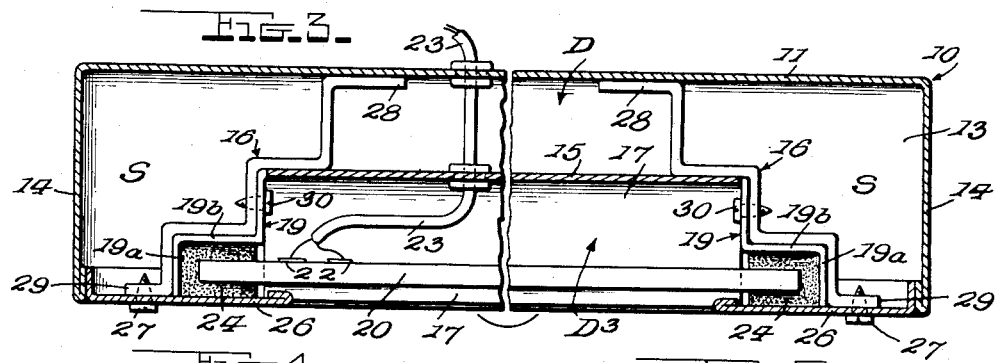
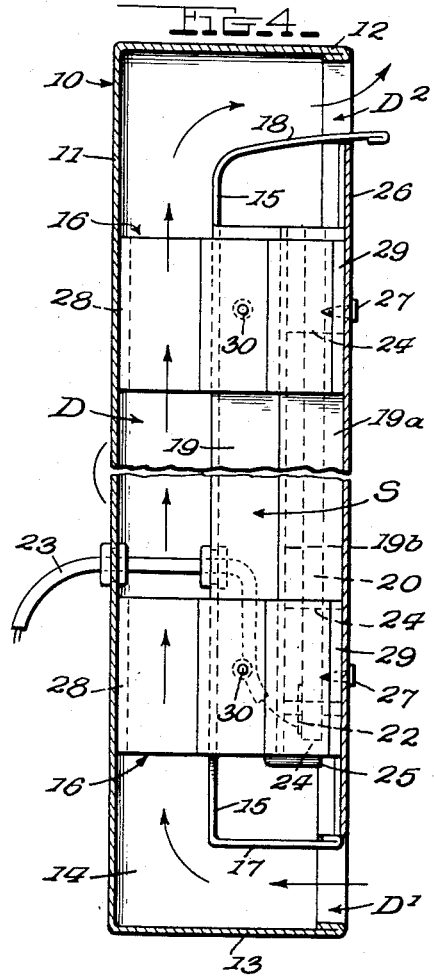
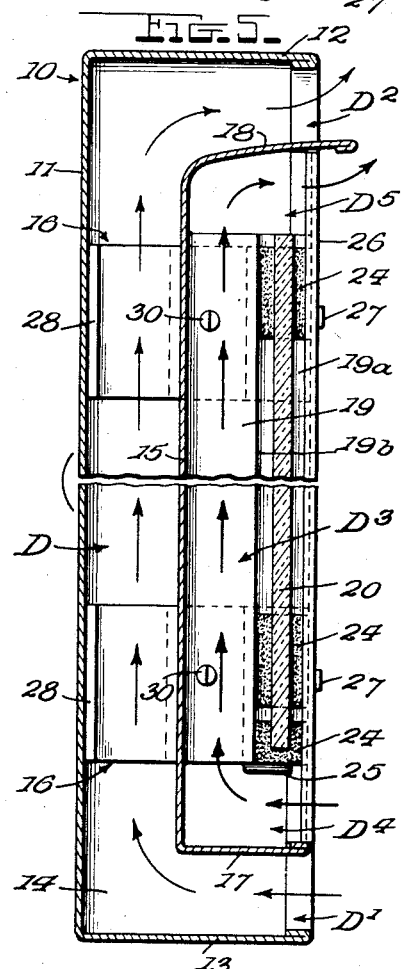
INVENTOR
Mabel W. Zellers
BY Lowry & Rinehart
ATTORNEYS

United States Patent Office 2,882,381
Patented Apr. 14, 1959

2,882,381

ELECTRIC HEATER

Mabel W. Zellers, Reading, Pa.

Application March 19, 1957, Serial No. 647,077

2 Claims. (Cl. 219—34)

This invention relates to an electric heater having a radiant heating panel. Such heaters are commonly installed against or inset into the walls of rooms. Not only do the walls absorb a great deal of heat which should be radiated into the rooms, but the heat to which the walls are subjected may be a fire hazard. The present invention is designed to overcome these difficulties.

The principal object of the invention is to provide a new and improved construction in which the radiant heating panel is mounted in the open front of a shallow casing which contains a vertical plate spaced rearwardly from said panel and spaced forwardly from the casing back, said plate having a lower forwardly projecting flange spaced downwardly from the heating panel and spaced upwardly from the casing bottom, and also having an upper forwardly projecting flange spaced upwardly from the heating panel and spaced downwardly from the casing top. Thus, while heat radiated rearwardly from the panel will heat the air entering the space between the panel and plate and cause the heated air to discharge under the upper flange, casing-cooling air will ascend in the space between said plate and the casing back and will discharge over the upper flange, thereby keeping the casing relatively cool.

Another object of the invention is to provide the plate with vertical forwardly projecting end flanges at the ends of the heating panel and inwardly spaced from the casing ends, thereby forming passages between said end flanges and casing ends through which some of the casing-cooling air may ascend, to prevent overheating of the casing ends.

Yet another object is to provide the end flanges of the plate with offset front portions which provide these flanges with forwardly facing shoulders, these shoulders being instrumental in mounting the heating panel.

A further object is to provide a simple and inexpensive construction which may be expeditiously manufactured and profitably sold at a reasonable price.

With the above and other objects in view that will become apparent as the nature of the invention is better understood, the same consists in the novel form, combination and arrangement of parts hereinafter more fully described, shown in the accompanying drawings, and particularly pointed out in the claims.

In the drawings:

Fig. 1 is a front elevation of the heater;

Fig. 2 is a similar view with parts removed and a portion of the heating panel broken away;

Fig. 3 is an enlarged horizontal sectional view on line 3—3 of Fig. 2;

Fig. 4 is an enlarged vertical sectional view on line 4—4 of Fig. 2; and

Fig. 5 is a similar view on line 5—5 of Fig. 2.

The drawings disclose a preferred construction; and while that construction will be rather specifically described, it is to be understood that variations may well be made.

A vertical rectangular sheet metal casing 10 is provided, said casing being shallow from front to rear and having an open front. The casing back wall 11 is joined to the top 12, the bottom 13, and the end walls 14, in any appropriate manner.

A vertical rectangular sheet metal plate 15 is mounted in the casing 10 on brackets 16, said plate being spaced forwardly from the back wall 11 to leave a cooling air duct D between said plate and wall. The plate 15 is of smaller size than the back wall 11, and said plate is spaced downwardly from the top 12, upwardly from the bottom 13 and inwardly from the end walls 14.

A lower flange 17 projects forwardly from the lower edge of the plate 15 and is upwardly spaced from the bottom 13 to provide an entrance throat $D^1$ for the duct D. An upper flange 18 projects forwardly from the upper edge of the plate 15 and is spaced downwardly from the top 12, leaving an air discharge passage $D^2$ for the duct.

Two vertical end flanges 19 project forwardly from the ends of the plate 15 and are inwardly spaced from the end walls 14, leaving spaces S through which some of the cooling air may ascend. The front portions 19a of the end flanges 19 are outwardly offset toward the end walls 14 to provide these flanges 19 with forwardly facing shoulders 19b which are instrumental in mounting the radiant heating panel 20.

As usual, the heating panel 20 is formed from glass and its rear side bears a printed-on heating element. A portion of this element is shown at 21 in Fig. 1, and terminals for said element are indicated at 22 in Figs. 3 and 4. A suitable current supply conductor is shown at 23 and its conductors are connected to the terminals 22.

The ends of the heating panel 20 are provided with channeled, yieldable mounting pads 24 which abut the offset portions 19a and the shoulders 19b of the end flanges 10; and two of the brackets 16 have forwardly projecting lugs 25 upon which two of said pads rest to support the weight of the panel. This panel is spaced forwardly from the plate 15, downwardly from the flange 18 and upwardly from the flange 17, providing an air-heating duct $D^3$ having an inlet throat $D^4$ and a discharge passage $D^5$.

Two relatively low and narrow closure strips 26 abut the outer sides of the pads 24 and are secured by screws 27 to the front ends of the brackets 16. These strips 26 extend outwardly from the flange portions 19a to the end walls 14 and close the fronts of the spaces S. The strips 26 are shown as extending upwardly to the flange 18 and downwardly to the flange 17 but they could of course be shorter.

The brackets 16 are preferably of stepped form as shown in Fig. 3, with their steps conforming to the offset and shouldered formations of the flanges 19 and the corners at which these flanges joint the plate 15. The rear ends 28 of the brackets are suitably secured to the back wall 11; and the front ends 29 project laterally for engagement by the screws 27. Other screws 30 are shown securing the flanges 19 to the brackets 16 to fixedly mount the plate 15.

During operation of the heater, air enters the throat $D^4$, flows upwardly in the duct $D^3$, and discharges through the passage $D^5$, as indicated by the heavy arrows in Figs. 1 and 4. The rearward radiation of heat from the panel 20 thus highly heats this air while additional forward radiation of heat is occurring from said panel. During air heating, overheating of the casing 10 is prevented by cooling air entering through the throat $D^2$, flowing upwardly through the duct D and spaces S and discharging through the passage $D^2$, as indicated by the light arrows of Figs. 1, 4 and 5.

It will be seen from the foregoing that novel and advantageous construction has been disclosed for attaining the desired ends, and while there is herein shown and described the preferred embodiment of the invention, at-

What is claimed is:

1. An electric heater comprising a vertical casing of shallow form from front to rear and having an open front, said casing having a back wall, vertical end walls, a top and a bottom; a radiant heating panel mounted in said open front of said casing, said heating panel being upwardly spaced from said bottom and being downwardly spaced from said top; and a vertical plate mounted in said casing between said heating panel and said back wall and spaced from both said panel and said back wall, said plate being upwardly spaced from said bottom and being downwardly spaced from said top, said plate having a lower forwardly projecting flange under said heating panel, said lower flange being downwardly spaced from said heating panel and being upwardly spaced from said bottom, said plate also having an upper forwardly projecting flange over said heating panel, said upper flange being upwardly spaced from said heating panel and being downwardly spaced from said top, and support brackets formed of sheet material extending from the back wall and offset horizontally around the ends of said plate to provide supports therefor; whereby air to be heated may enter over said lower flange and may ascend between said heating panel and said plate and the heated air may discharge under said upper flange, and casing-cooling air may enter under said lower flange, ascend between said plate and said back wall with minimum resistance offered by said brackets and discharge over said upper flange, said brackets providing minimum heat conduction to the back wall because of their extended cooling surfaces, while providing ample vertical rigidity, since the sheet material extends in the line of flow of the air and may have a minimum cross-sectional area compatible with the strength required, the ends of said heating panel and the ends of said plate being spaced inwardly from said end walls, said plate ends having vertical end flanges projecting forwardly at said ends of said heating panel, said end flanges being inwardly spaced from said end walls to permit some of the casing-cooling air to ascend in the spaces between said end flanges and said end walls, and relatively long and narrow closure strips secured to the outer ends of said brackets in position to close the fronts of said spaces.

2. An electric heater comprising a vertical casing of shallow form from front to rear and having an open front, said casing having a back wall, vertical end walls, a top and a bottom; a vertical plate mounted in said casing in forwardly spaced relation with said back wall, said plate being upwardly spaced from said bottom, downwardly spaced from said top and inwardly spaced from said end walls, said plate having a lower forwardly projecting flange spaced above said bottom, said plate also having an upper forwardly projecting flange spaced downwardly from said top, said plate also having vertical end flanges spaced inwardly from said end walls, the front portions of said end flanges being offset toward said end walls to provide said end flanges with forwardly facing shoulders; a vertically disposed radiant heating panel extending between said offset portions of said end flanges and having mounting pads abutting said offset portions and said shoulders, said heating panel being forwardly spaced from the aforesaid plate, upwardly spaced from said lower flange and downwardly spaced from said upper flange, and support brackets of sheet material extending from the back wall and offset horizontally around said vertical end flanges to provide supports for said plate; and fixed vertically elongated closure strips fixed to the outer side of said brackets and extending from said end flanges to said end walls and having portions abutting the front sides of the aforesaid mounting pads.

References Cited in the file of this patent

UNITED STATES PATENTS

| | | |
|---|---|---|
| 2,536,648 | Lamb | Jan. 2, 1951 |
| 2,715,174 | Nathanson | Aug. 9, 1955 |
| 2,781,440 | Petersen et al. | Feb. 12, 1957 |

FOREIGN PATENTS

| | | |
|---|---|---|
| 831,121 | Germany | Feb. 11, 1952 |